United States Patent
Bauman et al.

(10) Patent No.: US 9,128,489 B2
(45) Date of Patent: Sep. 8, 2015

(54) INDUCTIVELY COUPLED DISTRIBUTED CONTROL SYSTEM

(75) Inventors: Mark A. Bauman, College Place, WA (US); Tom J. Young, Walla Walla, WA (US); Craig B. Nelson, Walla Walla, WA (US); Chad D. Leinweber, Walla Walla, WA (US)

(73) Assignee: Nelson Irrigation Corporation, Walla Walla, WA (US)

( * ) Notice: Subject to any disclaimer, the term of this patent is extended or adjusted under 35 U.S.C. 154(b) by 414 days.

(21) Appl. No.: 13/022,796

(22) Filed: Feb. 8, 2011

(65) Prior Publication Data

US 2011/0196541 A1 Aug. 11, 2011

Related U.S. Application Data

(60) Provisional application No. 61/302,841, filed on Feb. 9, 2010.

(51) Int. Cl.
*G08B 7/00* (2006.01)
*G05B 19/00* (2006.01)
*H04M 9/00* (2006.01)
*H04L 12/28* (2006.01)
(Continued)

(52) U.S. Cl.
CPC .............. *G05D 7/06* (2013.01); *G05B 19/0421* (2013.01); *G05B 2219/25356* (2013.01)

(58) Field of Classification Search
CPC ............. H04B 3/56; H04B 2203/5483; H04B 2203/5425; H04B 2203/5433; H04B 2203/5458; H04B 3/54; H04B 5/0093; H01F 38/14; H01F 2038/305; H02J 7/025; H02J 5/005; A01G 25/16; A01G 25/167

USPC .................. 340/12.32, 12.38, 13.23, 538.16; 455/41.1

See application file for complete search history.

(56) References Cited

U.S. PATENT DOCUMENTS 2,385,673 A * 9/1945 Woodworth ....................... 307/3
4,142,178 A * 2/1979 Whyte et al. ................... 307/149
(Continued)

FOREIGN PATENT DOCUMENTS

WO 9217929 10/1992
WO 01/86899 11/2001

OTHER PUBLICATIONS

European Search Report cited in EP 11 74 2671 mailed Apr. 16, 2015, 6 pages.

*Primary Examiner* — Steven Lim
*Assistant Examiner* — Muhammad Adnan
(74) *Attorney, Agent, or Firm* — Nixon & Vanderhye P.C.

(57) ABSTRACT

A distributed control system is provided wherein a master controller inductively delivers power and data to a plurality of remote slave modules or controllers via a plurality of coupling loops formed along a length of transmission line. Each of the remote slave modules, in turn, inductively delivers return data to the master controller via the plurality of coupling loops. The use of inductive coupling provides an advantage over the state of the art because no direct galvanic electrical connection is required between the transmission line and the remote slave modules which promise to simplify installation and enhance long-term reliability. Example applications for the control system described herein include agricultural irrigation systems where individual sprinkler and valve components may be controlled collectively, individually, or in groups or subsets, to vary application rates according to prescribed irrigation parameters.

23 Claims, 14 Drawing Sheets

(51) Int. Cl.
*H04Q 5/22* (2006.01)
*G05B 11/01* (2006.01)
*G08C 19/16* (2006.01)
*H04B 3/00* (2006.01)
*G09B 21/00* (2006.01)
*H03K 17/00* (2006.01)
*H04Q 3/00* (2006.01)
*G05D 7/06* (2006.01)
*G05B 19/042* (2006.01)

(56) References Cited

U.S. PATENT DOCUMENTS

| | | | |
|---|---|---|---|
| 4,244,022 A * | 1/1981 | Kendall | 700/284 |
| 4,264,827 A * | 4/1981 | Herzog | 307/17 |
| 5,210,519 A * | 5/1993 | Moore | 375/258 |
| 5,272,381 A * | 12/1993 | Millard | 307/17 |
| 5,293,308 A * | 3/1994 | Boys et al. | 363/37 |
| 5,426,360 A | 6/1995 | Maraio | |
| 5,870,302 A | 2/1999 | Oliver | |
| 6,005,304 A | 12/1999 | Seelig | |
| 6,323,635 B1 | 11/2001 | Swain | |
| 6,577,230 B1 | 6/2003 | Wendt et al. | |
| 6,600,971 B1 | 7/2003 | Smith et al. | |
| 6,624,745 B1 | 9/2003 | Willer | |
| 6,812,826 B2 * | 11/2004 | Buhler et al. | 340/12.32 |
| 6,898,467 B1 | 5/2005 | Smith et al. | |
| 6,948,023 B2 | 9/2005 | Huang et al. | |
| 7,046,124 B2 * | 5/2006 | Cope et al. | 375/258 |
| 7,055,559 B2 | 6/2006 | Reinsch et al. | |
| 7,176,589 B2 | 2/2007 | Rouquette | |
| 7,369,045 B2 * | 5/2008 | Hansen | 340/538.16 |
| 7,525,420 B2 | 4/2009 | McKinney | |
| 7,714,682 B2 * | 5/2010 | Radtke | 333/177 |
| 8,108,078 B2 * | 1/2012 | Lorenz | 700/284 |
| 2003/0006882 A1 | 1/2003 | Buhler et al. | |
| 2003/0190110 A1 * | 10/2003 | Kline | 385/15 |
| 2003/0201873 A1 * | 10/2003 | Cern | 340/310.07 |
| 2003/0222748 A1 * | 12/2003 | Cern et al. | 336/178 |
| 2004/0179466 A1 * | 9/2004 | Parsadayan et al. | 370/201 |
| 2009/0271044 A1 * | 10/2009 | Bangalore | 700/284 |
| 2010/0164692 A1 * | 7/2010 | Nagasawa | 340/10.5 |

* cited by examiner

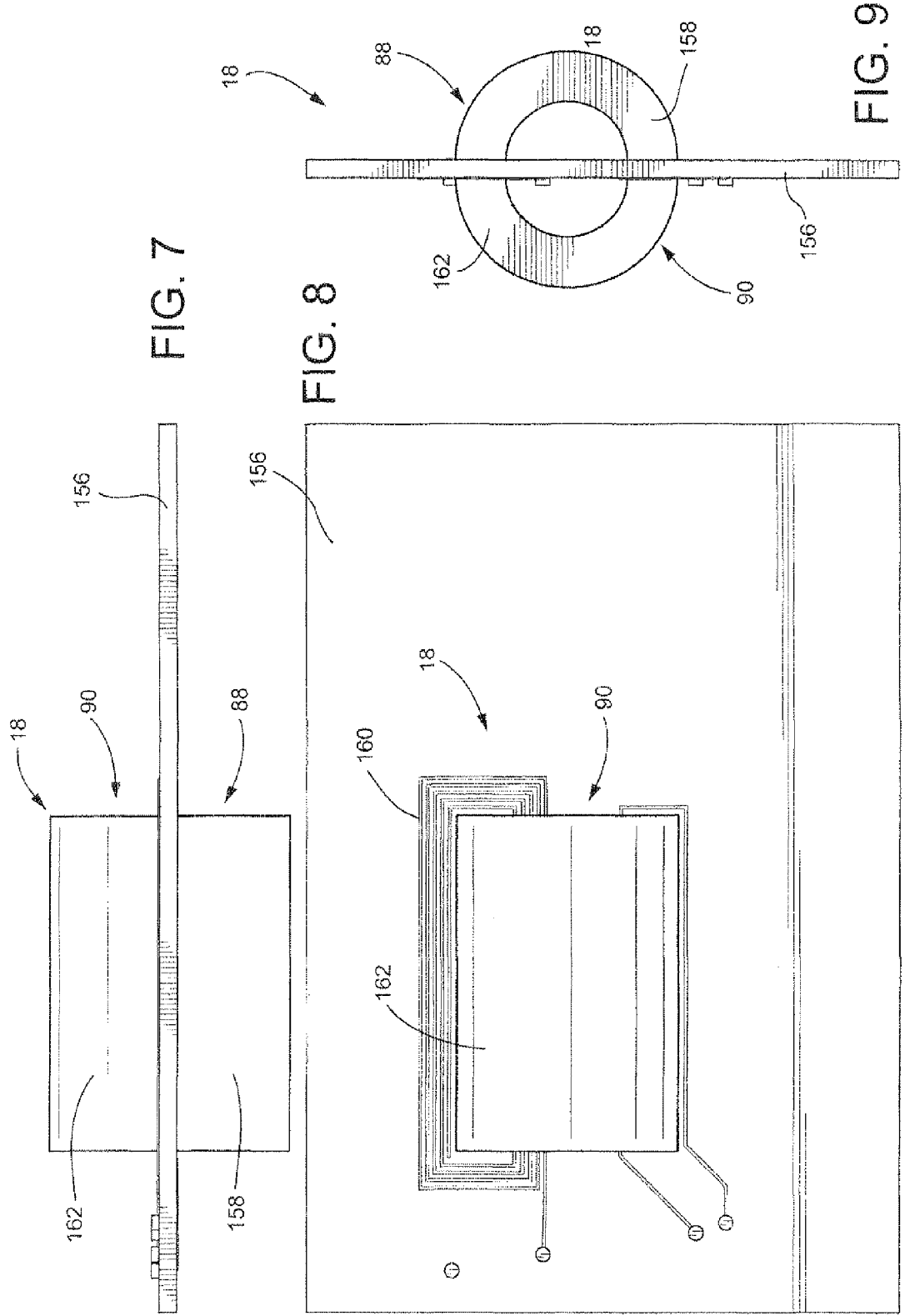

INDUCTIVELY COUPLED DISTRIBUTED CONTROL SYSTEM

Priority is hereby claimed from U.S. Provisional Application No. 61/302,841 filed Feb. 9, 2010, the entirety of which is incorporated herein by reference.

This invention relates generally to distributed controls technology and, more specifically, to the control of individual sprinkler or valve components in, for example, agricultural irrigation systems.

BACKGROUND

It is known to employ systems for distributing and transferring power and/or data to devices disposed along a transmission line or cable. Exemplary documentation in the U.S. patent literature includes the following: U.S. Pat. No. 7,176,589, discloses electrical devices such as inductive couplers, power conversion and modulation/demodulation circuits used in the distribution and/or transfer of power and/or data to electrical devices along an underwater cable; U.S. Pat. No. 6,624,745 discloses an inductively-coupled data communications system which distributes power and data along the same two-wire conductor between, e.g. network stations; U.S. Pat. No. 4,244,022 discloses a solid-state control system for large-scale irrigation that incorporates a central processing unit having a master clock and a central/syringe timing module system connected to a plurality of satellite controllers which are, in turn, connected to control irrigation solenoid valves. The listing above is by no means intended to be complete, but merely a sampling of patents relating to distributed power systems.

The invention described below is intended to simplify, ease installation and reliability, and potentially reduce cost in a distributed power system utilized in an exemplary but nonlimiting irrigation system.

BRIEF SUMMARY OF THE INVENTION

In an exemplary but nonlimiting embodiment, the invention provides a distributed control system wherein a master controller inductively delivers power and data to a plurality of remote slave modules or controllers via a plurality of coupling loops along a length of transmission line. In this exemplary embodiment, each of the remote slave modules, in turn, inductively delivers return data to the master controller via the plurality of coupling loops positioned along the length of transmission line. The use of inductive coupling provides an advantage over the state of the art because no direct galvanic electrical connection is required between the transmission line and the remote slave modules which promises to simplify installation and enhance long-term reliability.

Example applications for the control system described herein include agricultural irrigation systems where individual sprinkler components may be controlled collectively, individually, or in groups or subsets, to vary application rates according to prescribed irrigation parameters.

Accordingly, in one exemplary but nonlimiting aspect, there is provided a distributed control system comprising a master controller connected to a transmission line and adapted to deliver power and data to the transmission line and to receive data from the transmission line; the transmission line comprised of first and second conductors configured to carry differential data; and a plurality of couplers arranged along the transmission line, each coupler enclosing a pair of inductive coupling loops formed in the transmission line, and passing through an inductor or coil to thereby establish mutual coupling between the transmission line and the inductor, said inductor connected to one or more slave controllers; wherein said mutual coupling permits data transfer from the master controller to the one or more slave controllers and from the one or more slave controllers to the master controller.

In another exemplary but nonlimiting aspect, there is provided a coupler assembly for electrically coupling a transmission line and a slave controller where the coupler assembly comprises a housing including a lower body portion and an upper cover portion, and a split core, and wherein the upper cover portion is moveable between open and closed positions, and wherein a first half of the split core and inductive coupling loops formed in the transmission line are supported in the upper cover portion, and wherein a second half of the split core and a coil are supported in the lower body portion.

In still another exemplary but nonlimiting aspect, there is provided a method of controlling a plurality of sprinkler components in an irrigation system that includes a master controller for controlling a plurality of slave controllers operatively connected to one or more of the plurality of sprinkler components, the method comprising arranging a plurality of inductive coupling loops along a transmission line, and mutually coupling the transmission line to the plurality of slave controllers; and sending signals over the transmission line from the master controller to the plurality of slave controllers and receiving signals over the transmission line from the plurality of slave controllers to the master controller.

The invention will now be described in greater detail in connection with the drawings identified below.

BRIEF DESCRIPTION OF THE DRAWINGS

FIG. 7 is a front elevation view of the circuit board shown in FIG. 6;

FIG. 8 is a plan view of the circuit board shown in FIG. 6;

FIG. 9 is a side edge view of the circuit board shown in FIG. 6, rotated to a vertical orientation;

DETAILED DESCRIPTION OF THE INVENTION

Figure 1:
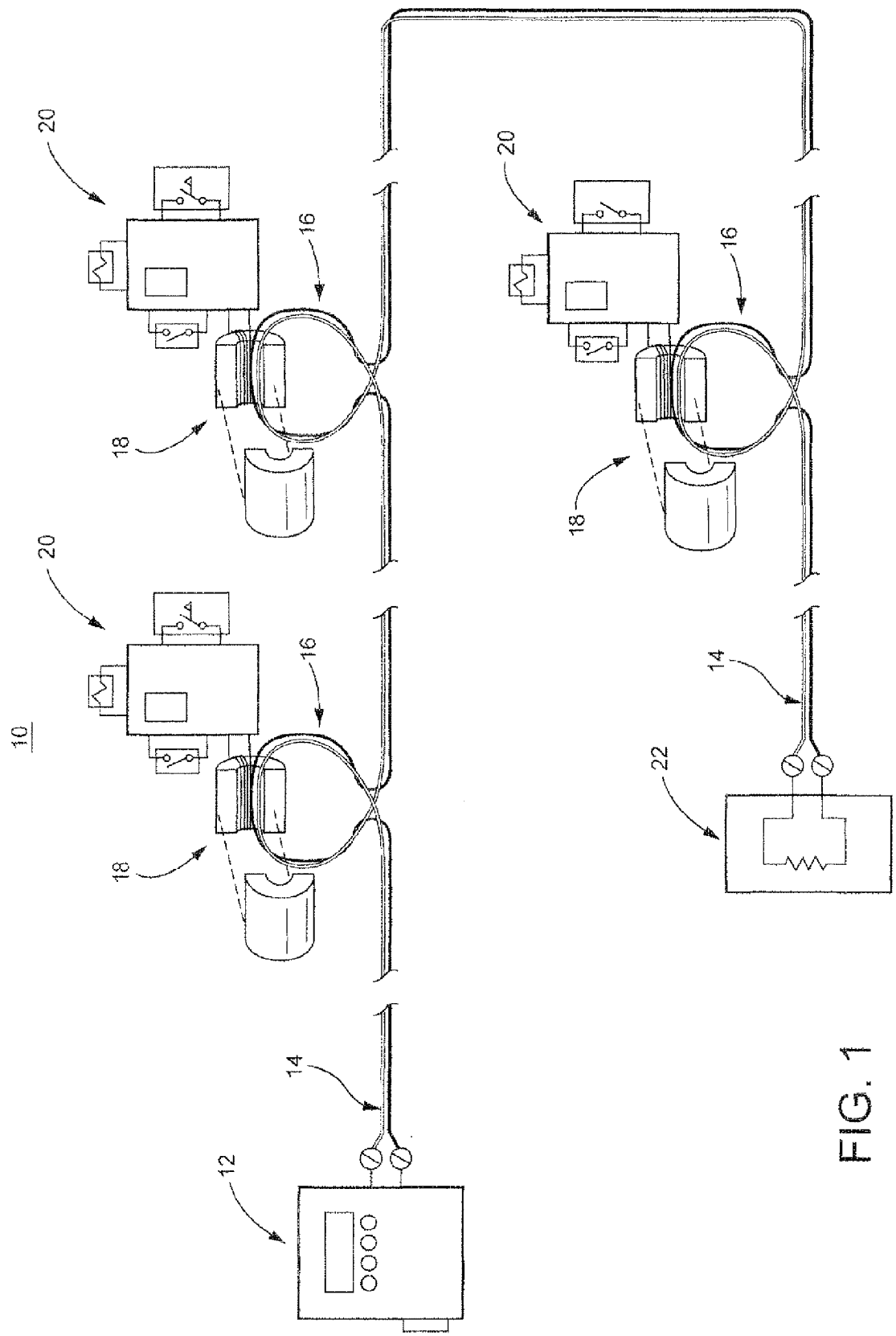
FIG. 1 is a simplified schematic diagram showing the control system in accordance with an exemplary but nonlimiting embodiment.

An inductively coupled distributed control system 10 for use with, for example, irrigation machinery, is shown in FIG. 1 in simplified form for ease of understanding. A master controller 12 is connected to a transmission line 14. The master controller 12 is provided in the control system 10 to deliver power and command data to the transmission line 14, and is further configured to receive status and sensory data delivered by the transmission line 14.

The power delivered by the master controller 12 to the transmission line 14 is in a time multiplexed format, having a frequency less than about 200 kHz, and amplitude less than about 48 volts peak-to-peak. The data delivered by the master controller 12 to the transmission line 14 is specified as a command protocol wherein the data is modulated in continuous wave fashion, although other forms of modulation can be employed including frequency-shift keying, phase-shift keying, pulse-coded modulation, or other forms of modulation known in the art.

The data received by the master controller 12 from the transmission line 14 is specified as a status protocol wherein the data is demodulated from a continuous wave signal, although other forms of modulation can be employed including frequency-shift keying, phase-shift keying, pulse-coded modulation, or other forms of modulation known in the art. The modulation frequency of the transmitted signal and the received signal may be at the same or different frequencies, depending on the application. In a preferred embodiment, the received carrier frequency is less than about 1000 kHz.

The transmission line 14 is a balanced transmission line having two conductors (see conductors 92a and 92b in FIG. 3) which are configured to carry differential signals. In this manner, the signals propagate along the length of the transmission line 14 with minimal attenuation because the field of each conductor effectively cancels to reduce radiated emissions. The transmission line 14 has a characteristic impedance value which is a function of its construction and environment. In a preferred embodiment, the characteristic impedance of the transmission line 14 is less than 200 ohms. The transmission line 14 can be twin-lead or twisted-pair-type of transmission line, and can be shielded or unshielded depending on the application.

Referring still to FIG. 1, along the transmission line 14, the conductors are formed into a plurality of coupling loops 16, wherein a portion of each coupling loop 16 is routed through a coupler 18. The details of each of the coupling loops 16 and respective coupler 18 will be discussed in further detail below. Each coupler 18 is connected to a slave module or controller 20, the details of which also will be discussed in further detail below. A line termination 22 is connected to an end of the transmission line 14. In a preferred embodiment, the line termination 22 is a resistor having a resistance value that approximates the characteristic impedance of the transmission line 14. One skilled in the art would recognize that other types of loads could be used as the line termination 22 such as inductive or capacitive loads without departing from the scope of this invention.

Figure 2:
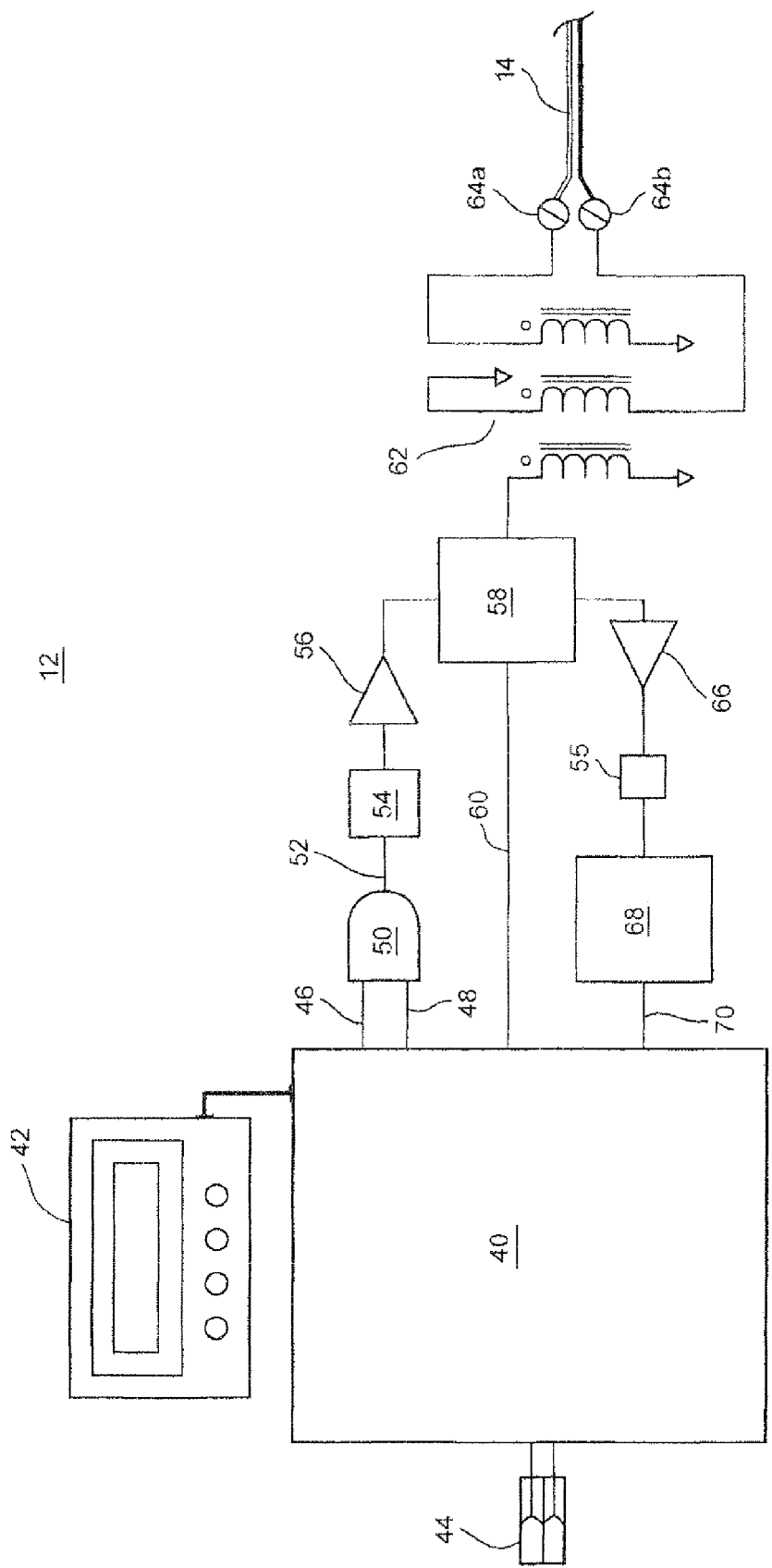
FIG. 2 is a schematic diagram of a master controller taken from the control system of FIG. 1.

Referring now to FIG. 2, the master controller 12 includes a microcontroller 40 which is configured to power and communicate with each of the plurality of slave modules 20 (FIG. 1). The microcontroller 40 is connected to a user interface 42 which enables an operator to configure and operate the distributed control system 10 (FIG. 1). The microcontroller 40 is further linked to a communications port 44 to enable information exchange with other systems including other controllers.

A carrier signal 46 is generated by the microcontroller 40 to facilitate power and data transmission along the transmission line 14. The carrier signal 46 can be in the form of a square wave or a sine wave depending on the application. The microcontroller 40 further generates a data signal 48 which reflects a protocol that is defined within the microcontroller 40. An AND gate 50 is connected to each of the carrier signal 46 and data signal 48 to provide a modulated output signal generally designated by the numeral 52. The signal 52 is passed through a signal filter 54 to remove unwanted spectral artifacts and a resultant signal is amplified by a transmit driver 56. A transmit/receive switch 58 is connected in receiving relation to the signal provided by the transmit driver 56 and is connected to a balun transformer 62 and is configured to provide differential power and data signals to the transmission line 14 via connectors 64a and 64b in response to a switch control signal 60 provided by the microcontroller 40.

Differential return data signals coming from the transmission line 14 are transferred through the balun transformer 62 as single-ended signals to the transmit/receive switch 58. The microcontroller 40 is configured to provide a period when return data signals can be transferred from the slave modules 20 (FIG. 1) by commanding the transmit/receive switch 58 into a receive mode, so that signals from the transmission line 14 are routed to the return signal amplifier 66 and return signal filter 55 and then to the return logic receiver 68. Here the returned signals are conditioned to provide logic level data and are sent to the microcontroller 40 via the return data line 70.

Figure 3:
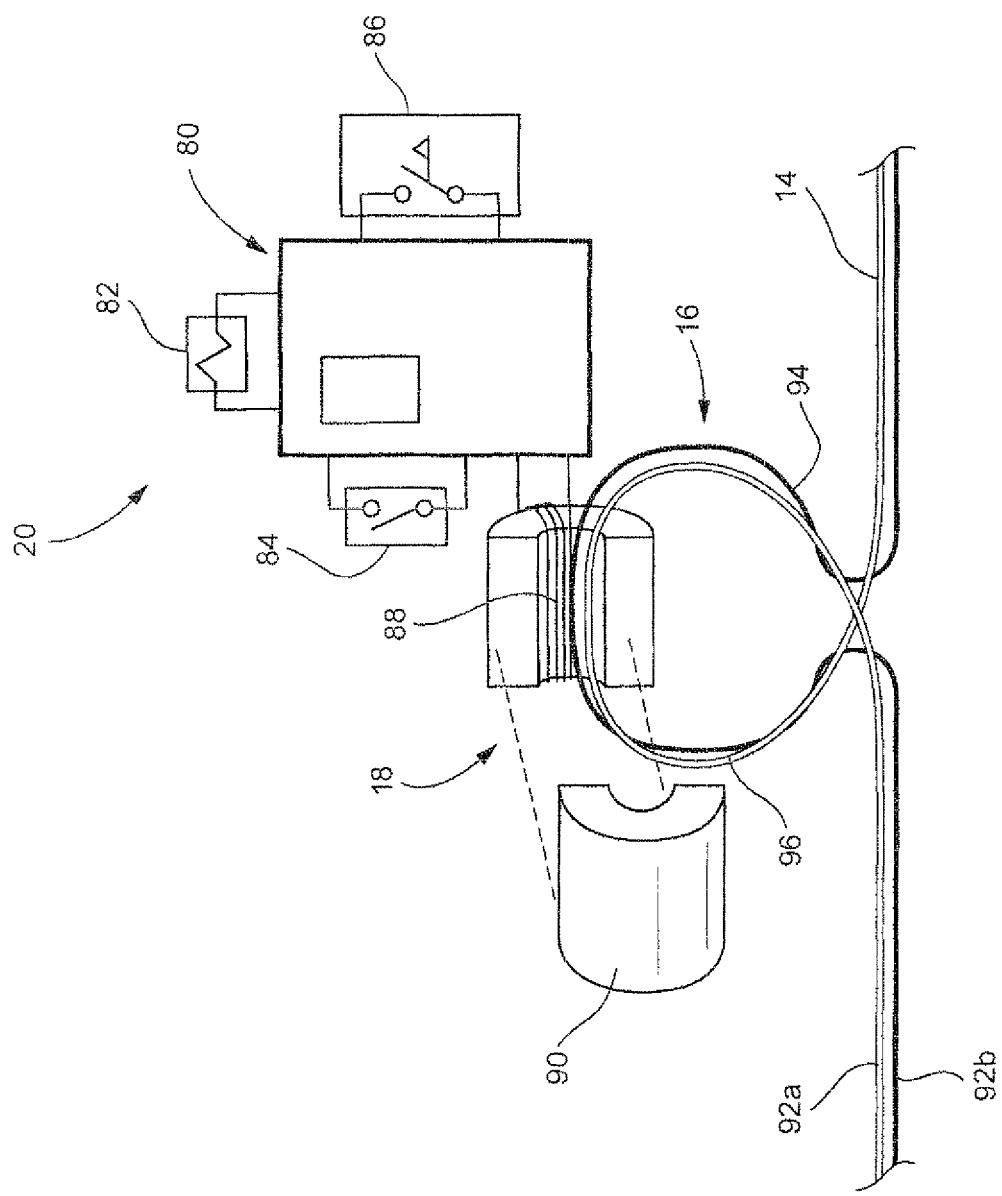
FIG. 3 is an enlarged schematic of one of the slave controllers taken from the control system of FIG. 1.

Referring now to FIG. 3, a slave controller 20 is shown in association with the coupling loop 16. The slave controller 20 includes the coupler 18 that is connected to the slave control assembly 80, described in further detail below. The slave control assembly 80 is connected to a solenoid 82. The solenoid 82 is used to actuate a sprinkler component such as, for example, a valve (not shown), but may be used for other switching applications. In addition, other loads such as stepper motors could be used without departing from the scope of this invention. In a preferred embodiment, the solenoid 82 is a bi-stable latching solenoid. An alert switch 84 is connected to the slave control assembly 80 and is configured to provide a user request which may include initialization. The slave control assembly 80 may also be connected to a flow switch 86 that provides a contact closure when the flow rate of a fluid in a conduit exceeds a preset value. Other sensors could similarly be connected to the slave control assembly 80 without departing from the scope of the invention.

The coupler 18 is composed of a coupler inductor 88 and a coupler closure 90. The combination forms a toroid type inductor which is characterized by its containment of the magnetic flux. When the coupling loop 16 and coupler inductor 88 are configured as shown in FIG. 3, and the coupler closure 90 is brought into close proximity and in mating relation to the coupler inductor 88, a loose inductive or mutual couple is formed which enables transfer of energy and data as will be discussed in further detail below.

The transmission line 14 includes the first conductor 92a and second conductor 92b which, in combination, are configured to propagate differential signals over the length of the transmission line 14. Since the signals in the respective conductors 92*a* and 92*b* are differential in nature, little useful energy can be coupled from and to the line since the field from each line will cancel. However, by arranging conductor 92*b* and forming a circular, 360° substantially closed loop generally designated by the numeral 94 referred herein as an in-phase loop, and further taking conductor 92*a* and twisting it, and then forming a loop generally designated by the numeral 96 (herein referred to as a counter-phase loop), the differential signals in the conductors provide a local region of in-phase fields so they add over the localized region of the coupling loop 16. This localized region of in-phase fields found in the coupling loop 16 enables effective inductive coupling between the differential signals found in conductors 92*a* and 92*b* and the coupler inductor 88. In a preferred embodiment, the core material used in the coupler 18 is composed of a powdered ferrite material, and wherein the inductance of the coupler inductor 88 is approximately 150 uH when the coupler closure 90 is mated with the coupler inductor 88 as described further below. Also, in a preferred embodiment, the inductance of the coupling loop is less than 1.4 uH, and the diameter of the coupling loop 16 is less than 50 mm.

It has been found that increasing the inductance of the coupling loop 16 improves the transfer of power from transmission line 14 to the coupler inductor 88 effectively changing a degree of coupling. For this reason, there is an optimum degree of coupling that exists for a given number of slave modules 20, wherein as the number of slave modules 20 is increased, the degree of coupling should be decreased to ensure that the power requirement for all slave modules 20 is satisfied.

Figure 4:
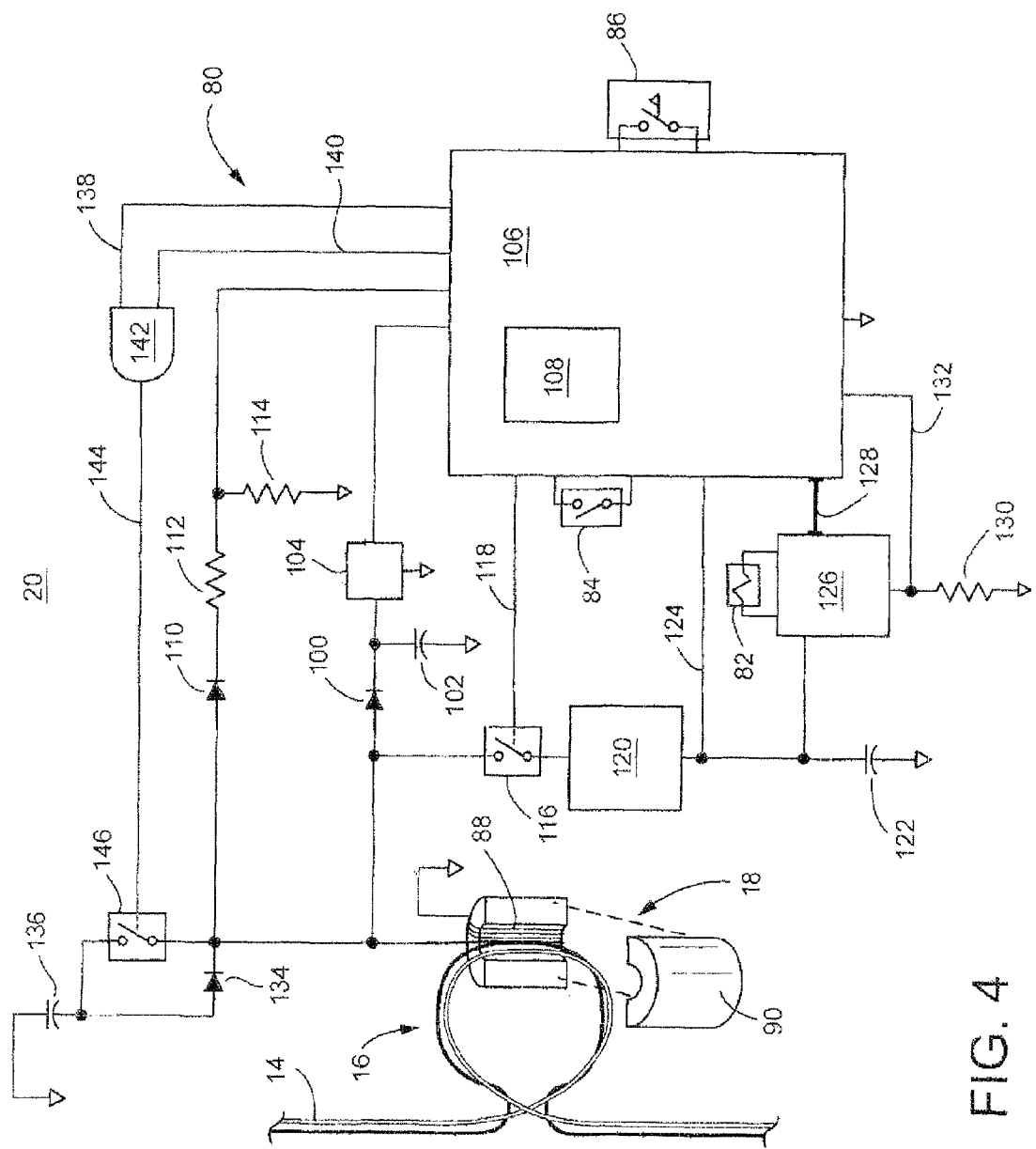
FIG. 4 is a more detailed schematic diagram of the slave controller shown in FIG. 3.
Figure 5:
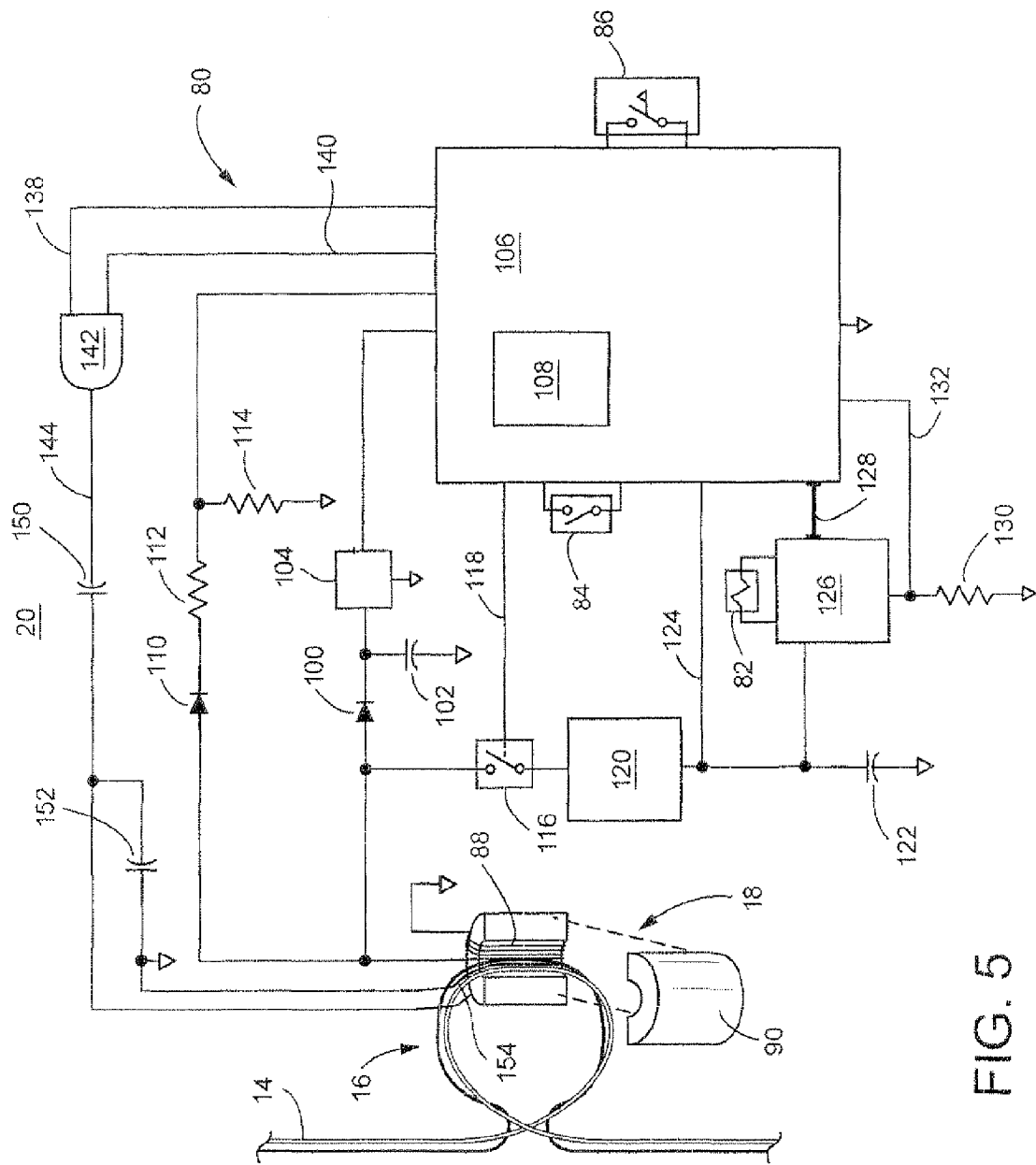
FIG. 5 is a schematic diagram of the slave controller in an alternate embodiment.
Figure 6:
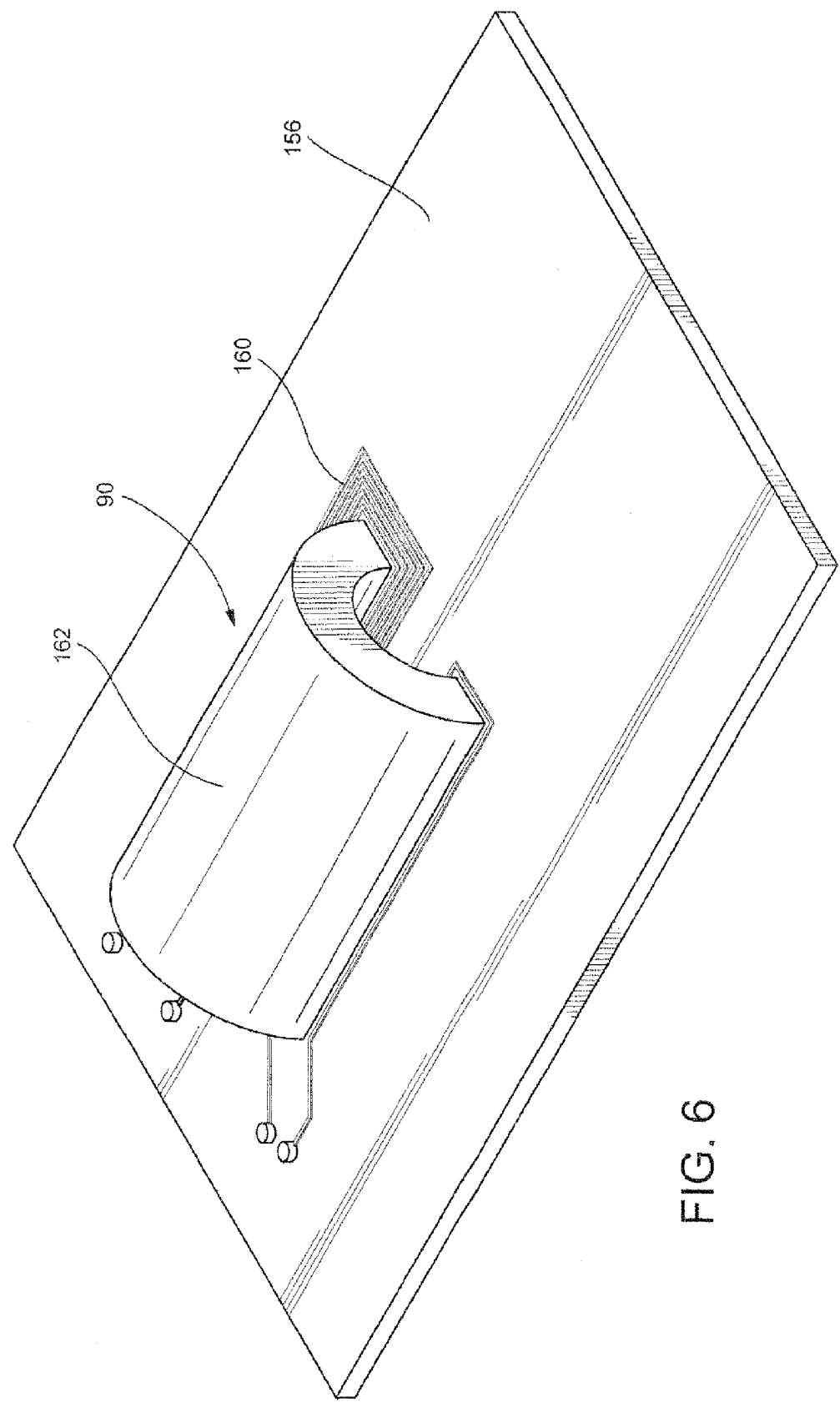
FIG. 6 is a perspective view of a slave controller circuit board in accordance with the exemplary embodiment.

Referring now to FIGS. 4 and 5, the slave module 20 which includes the slave control assembly 80 is coupled to the transmission line 14 via the coupling loop 16. The coupler inductor 88 is configured to extract and induce power into the transmission line 14 as discussed above. One lead of the coupler inductor 88 is connected to a common ground for the module, while another lead connects to the logic rectifier 100. The logic rectifier 100 provides a positive pulsating direct current relative to common from the alternating current induced into the coupler inductor 88 from the coupling loop 16 and is smoothed by a capacitor 102. The smoothed voltage at the capacitor 102 is fed to the input of a voltage regulator 104.

The voltage regulator 104 provides a stabilized voltage output power supply for a microcontroller 106 and a nonvolatile memory 108. The nonvolatile memory 108 includes an identity address which provides a unique identifier for the slave module 20. The microcontroller 106 is also connected to the alert switch 84 and the flow switch 86 as discussed above.

The coupler inductor 88 is also connected to a data rectifier 110 that demodulates the signals from a coupling loop 16 into data signals. These signals are conditioned to a logic level suitable for connection to the microcontroller 106 via data series resistor 112 and data parallel resistor 114 that form a voltage divider. Herein, commands and data originating from the master controller 12 (FIG. 1) are provided to the microcontroller 106 and are configured as time-sequenced, asynchronous, serialized data. One skilled in the art would recognize that other forms of data encoding could be used without departing from the scope of the invention.

The microcontroller 106 is configured to respond to only commands and data that are directed to match its embedded identity and stored in the nonvolatile memory 108. This match can occur when a command includes an address that specifically matches the identity in the nonvolatile memory 108 relative to a synchronization phase, so that a plurality of slave modules 20 can respond to a single command in a time-synchronized manner.

The coupler inductor 88 is connected to solenoid drive voltage switch 116 that is controlled by solenoid drive voltage switch control line 118 that is controlled by the microcontroller 106. The control of this line will be discussed in further detail below. When the voltage switch 116 is closed, alternating current induced from the transmission line 14 to the coupler inductor 88 is provided to a voltage multiplier 120. This voltage multiplier rectifies and provides a passive step-up converter using a combination of diodes and capacitors. In a preferred embodiment, a half-wave series multiplier fashioned using a Villard cascade topology is utilized, although other types of multipliers known in the art could be used without departing from the scope of the invention.

Energy from the multiplier 120 is stored in the solenoid drive voltage capacitor 122. A solenoid drive monitor line 124 is connected to the capacitor 122 and the microcontroller 106 to enable it to sense the voltage on the capacitor. In this manner, the microcontroller 106 can command the solenoid drive voltage switch 116 so that a specific target voltage can be maintained across the capacitor 122. One skilled in the art would recognize other ways to maintain a specific target voltage, including holding the solenoid drive voltage switch 116 in a closed position with a zener diode connected in parallel with the capacitor 122 to maintain a target voltage. An H-bridge solenoid driver 126 is connected in supply-side relation to the capacitor 122. The solenoid driver 126 is connected to the solenoid 82 in driving relation and is able to drive the solenoid 82 in both a forward and reverse manner in response to commands provided by the microcontroller 106 as it drives the H-bridge control line 128. In a preferred embodiment, the solenoid drive voltage capacitor 122 is maintained in a fully charged state, so in the event of a power or transmission line failure, the solenoid 82 can be set to a default state previously determined by a user. Current delivered to the solenoid 82 is directed through an H-bridge current sense resistor 130, wherein a voltage is provided that is proportional to the current traveling through the solenoid 82 and is made available to the microcontroller 106 by a current sense line 132. In this manner, the microcontroller 106 can monitor the time-varying voltage along the sense line 132 during state changes of the solenoid 82 to determine its operational condition.

Referring exclusively to FIG. 4, the coupler inductor 88 is further connected to a data return rectifier 134 that rectifies negative-going pulses of the alternating current induced into the coupler inductor 88 from the transmission line 14. The cathode of the rectifier 134 is connected to a data return storage capacitor 136 where a negative voltage relative to common is stored until it is needed for a data return transmission from the slave module 20 to the master controller 12. The microcontroller 106 originates a return carrier signal 138, and in a preferred embodiment, the frequency of the signal is less than 1000 kHz.

The microcontroller 106 further provides a data signal 140 which reflects a protocol that is defined within the microcontroller 106. An AND gate 142 is connected to each of the return carrier signal 138 and the data signal 140 to provide a modulated output signal generally designated by the numeral 144. A return voltage switch 146 is configured to respond to the modulated output signal 144 to switch the negative voltage present on the capacitor 136 back into the coupler inductor 88 at a rate that matches the signal 144. In this manner, the negative voltage will induce a current into the coupler inductor 88, creating a magnetic field in the coupling loop 16, wherein a differential return data signal will be induced into the transmission line 14 which will propagate along the transmission line and back to the master controller 12 where it will be received and decoded as described above.

Referring now to the alternative configuration in FIG. 5, the modulated output signal generally designated by the numeral 144 is connected to a transmit-coupling capacitor 150. A transmit coil or inductor 154 is wound or positioned adjacent to the coupler inductor 88. A transmit coil tank capacitor 152 is connected in parallel with the transmit inductor 154 to provide an LC circuit with a resonant frequency that is approximately equal to the return carrier signal 140 frequency. In this manner, a current is provided to the transmit inductor 154, creating a magnetic field in the coupling loop 16, wherein a differential return data signal will be induced into the transmission line 14 which will propagate along the transmission line and back to the master controller 12 where it will be received and decoded as described above. One skilled in the art would recognize that there are other ways to couple the return data from the microcontroller 106 to the transmission line 14 including inserting a single or plurality of diodes in series connection to the inductor 154.

Figure 10:
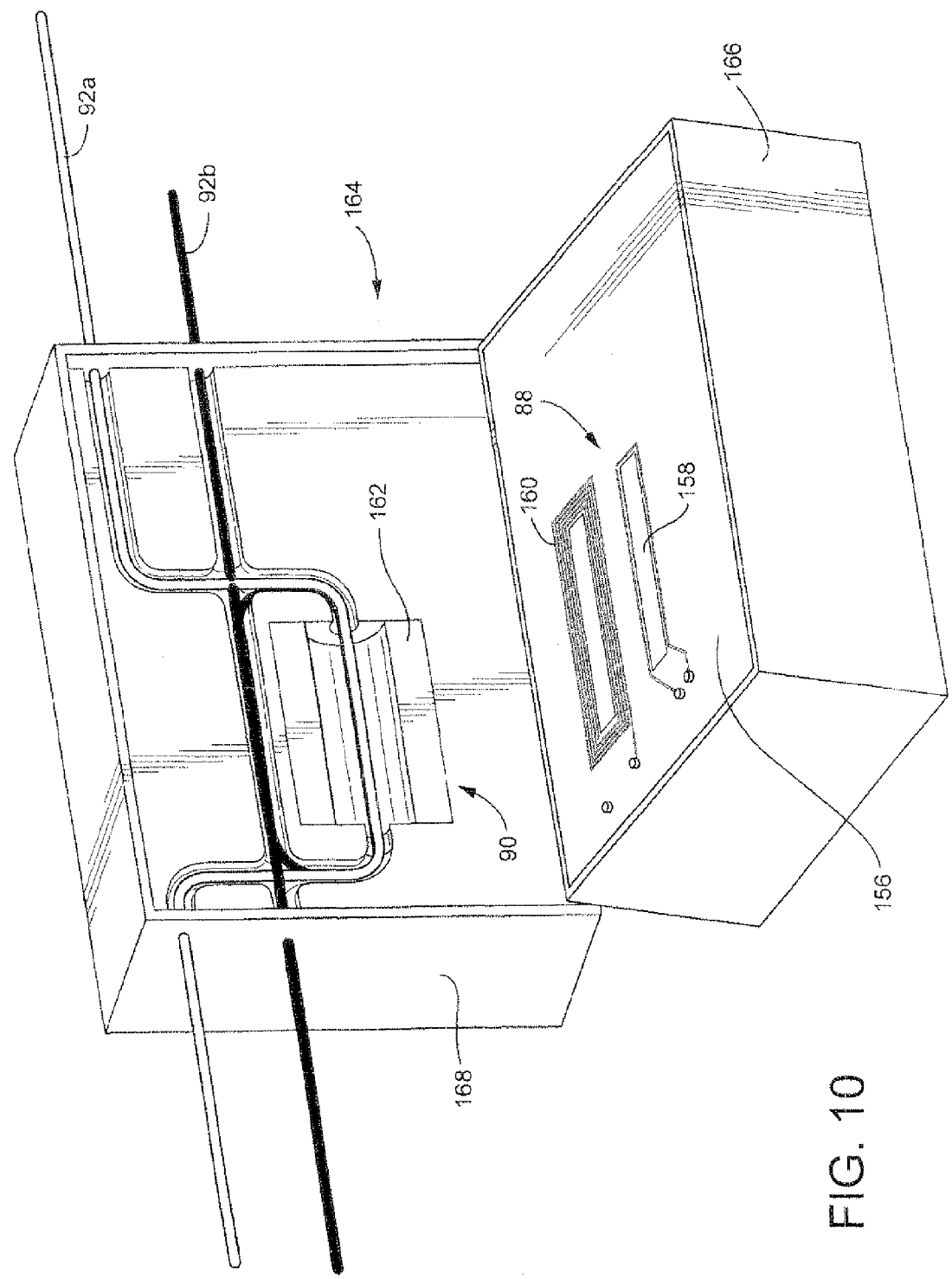
FIG. 10 is a perspective view of a slave controller circuit board mounted within a housing.
Figure 11:
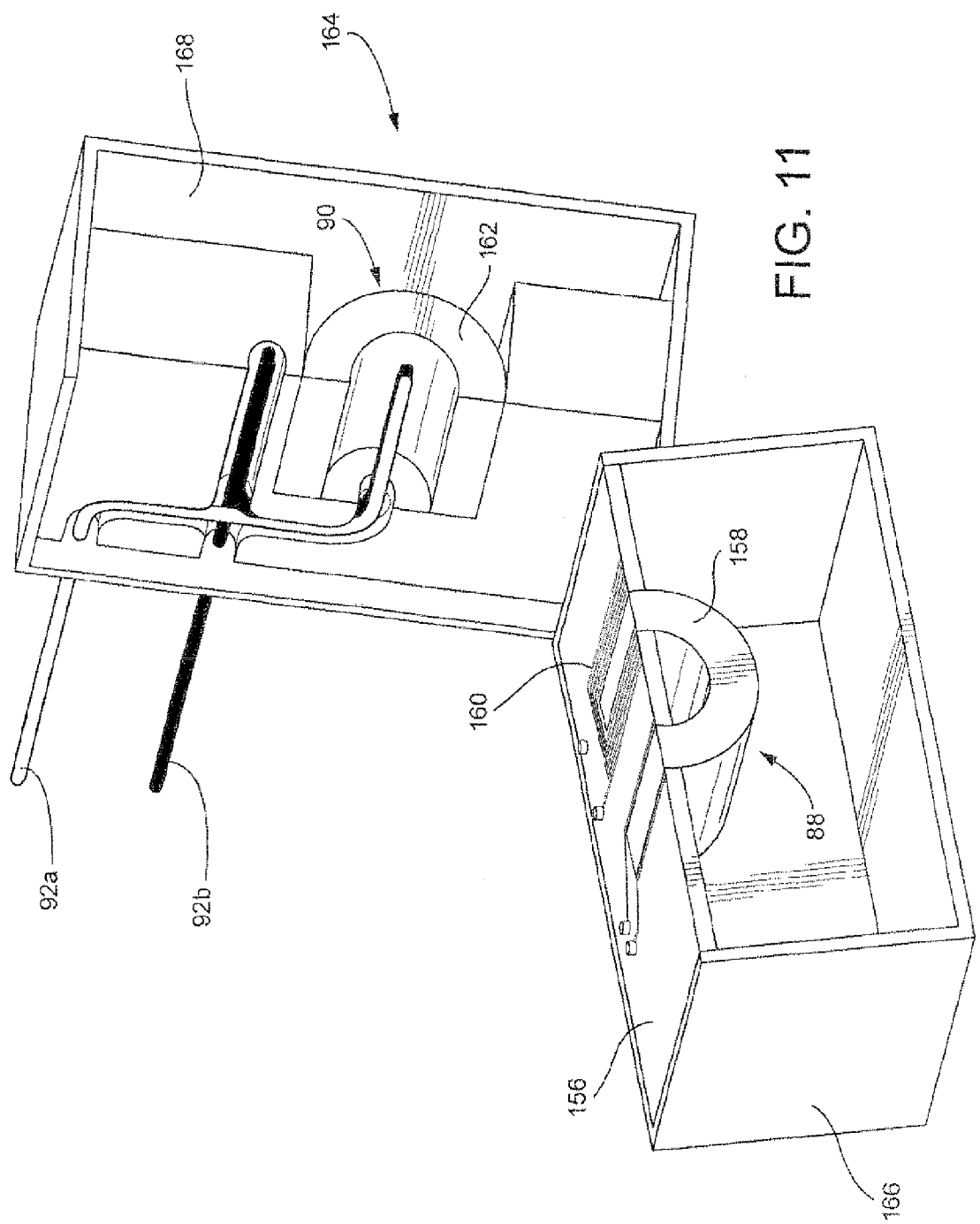
FIG. 11 is a perspective view of the slave controller shown in FIG. 10 but shown here in cutaway form.

FIGS. 6-9 illustrate an exemplary slave controller circuit board 156 supporting the coupler 18 formed by the inductor 88 and coupler closure 90. The coupler inductor comprises a first, split ferrite core portion 158 and winding or coil 160 wrapped about the core. The coupler closure 90 is formed by the second, mating split ferrite core portion 162. FIGS. 10 and 11 illustrate the slave controller board 156 including the coupler inductor 88 and coupler closure 90 mounted within a slave controller housing 164 through which the conductors 92*a* and 92*b* pass in the looped configuration described above in connection with FIG. 3. The housing 164 may be configured to include a lower body portion 166 and an upper cover portion 168; with the upper cover portion 168 pivotally supported on the lower body portion 166 and moveable between closed and open positions, the open position shown in FIG. 10. By supporting the coupler closure 90 in the upper cover portion 168 of the housing 164, easy access to the coupler 88 is provided upon opening the housing.

The control system described herein has many applications in, for example, various agricultural irrigation systems including solid-set, linear and pivot machinery where many individual sprinklers are carried on common water-supply conduits or trusses. In exemplary configurations, the master controller 12 may be secured at one end of the machine, with the slave controllers secured in proximity to respective individual sprinklers. Each slave controller may be connected to a solenoid, (see solenoid 82 in FIG. 3), stepper motor or other suitable actuator device that operates a valve in proximity to the respective sprinkler inlet.

The distributed control system as described herein has many applications in (but is not limited to) agricultural irrigation.

Figure 12:
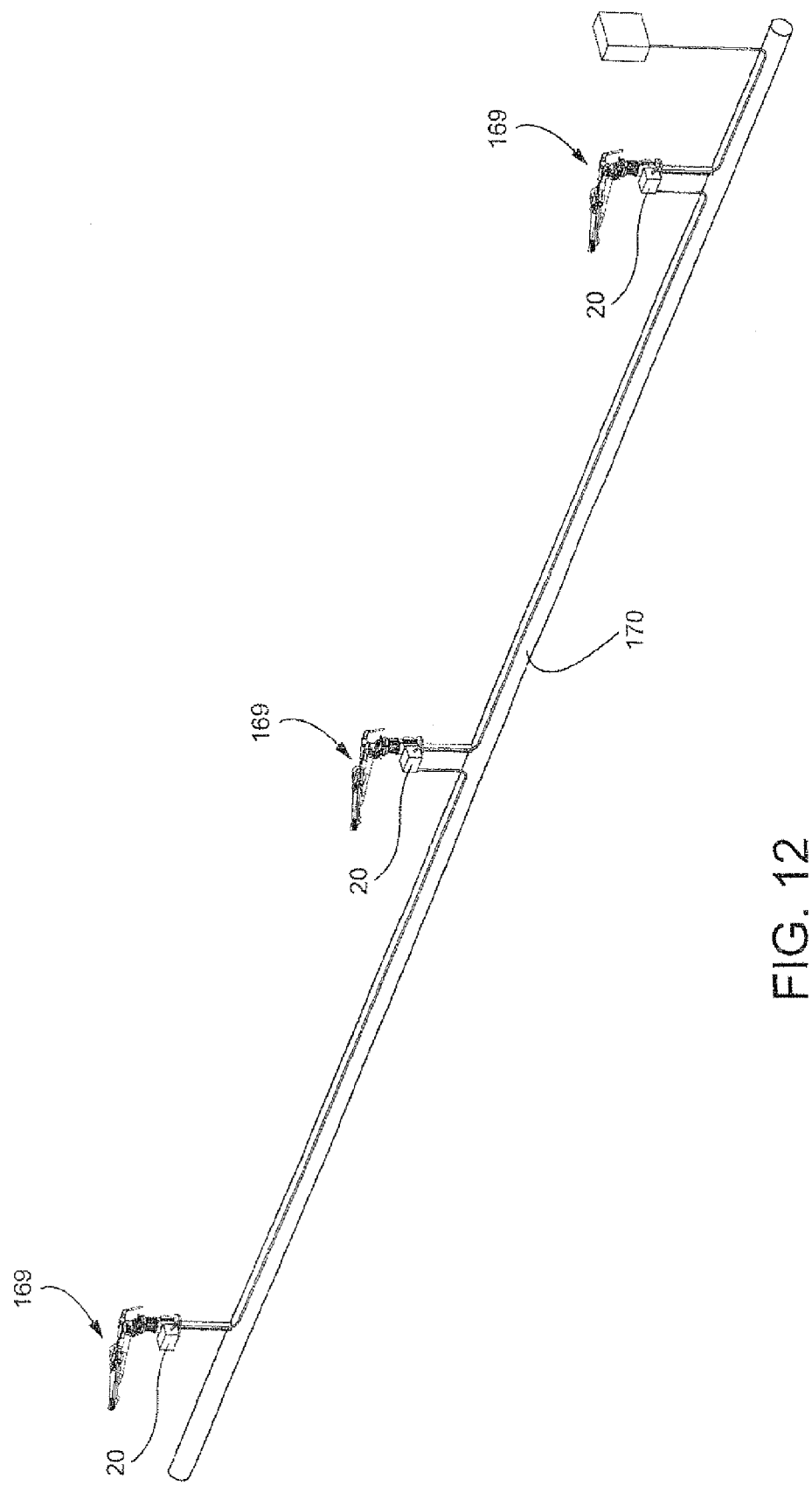
FIG. 12 shows an example embodiment where the master controller and slave controllers are mounted along a solid set irrigation line.

With respect to agricultural irrigation, FIG. 12 illustrates an exemplary but nonlimiting application for the subject invention, where the individual slave controllers 20 (connected to a master controller 12), are secured at the base of, for example, gun-type sprinkler components 169 including valves that are mounted along a fixed ground engaging conduit 170 in a solid-set irrigation system.

Figure 13:
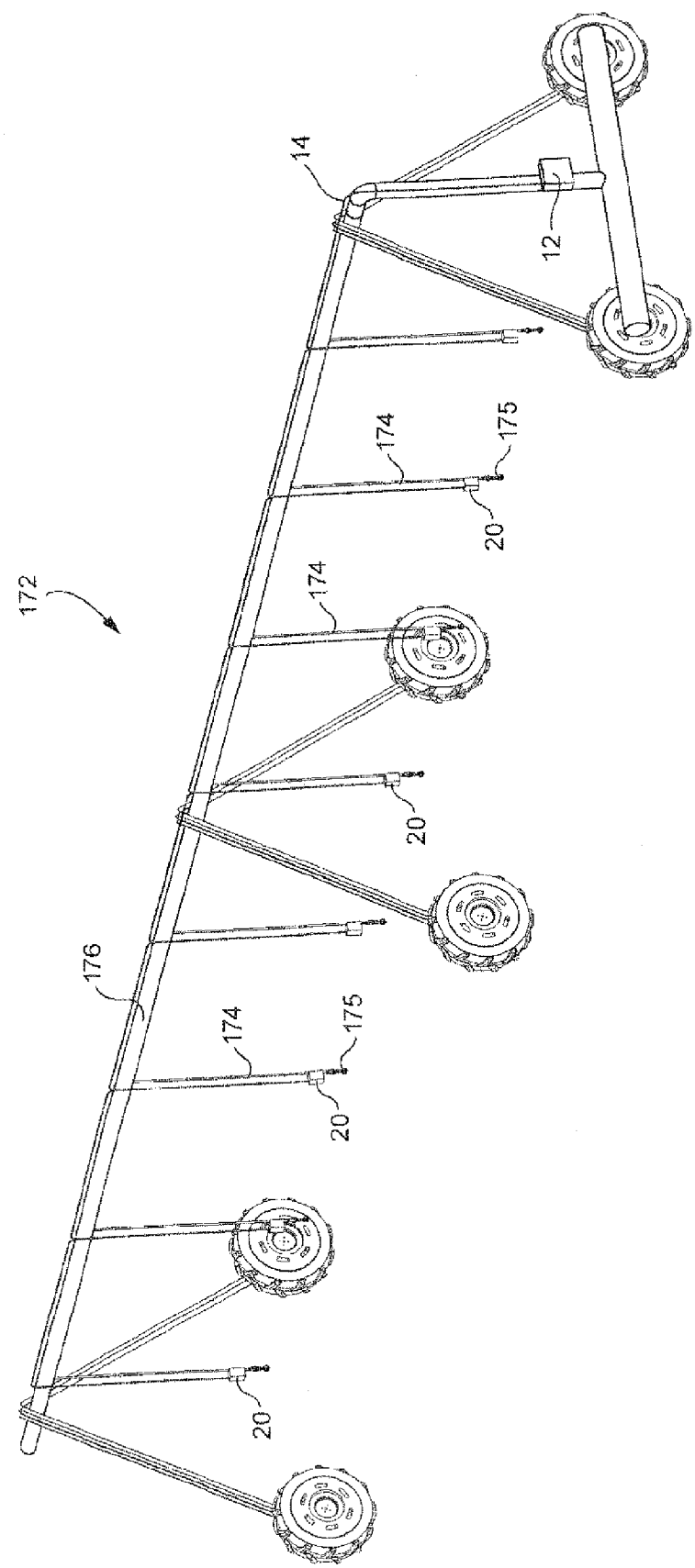
FIG. 13 is a perspective view of another application where the master controller is mounted at one end of a linear irrigation machine and slave controllers are mounted adjacent to individual sprinklers on drop hoses suspended from an overhead truss of the machine.

FIG. 13 illustrates another example application where the master controller 12 and individual slave controllers or modules 20 are mounted on a linear irrigation machine 172. In this embodiment, the slave modules 20 are located on the drop hoses 174 associated with each of the individual sprinklers 175, suspended from the overhead truss 176.

Figure 14:
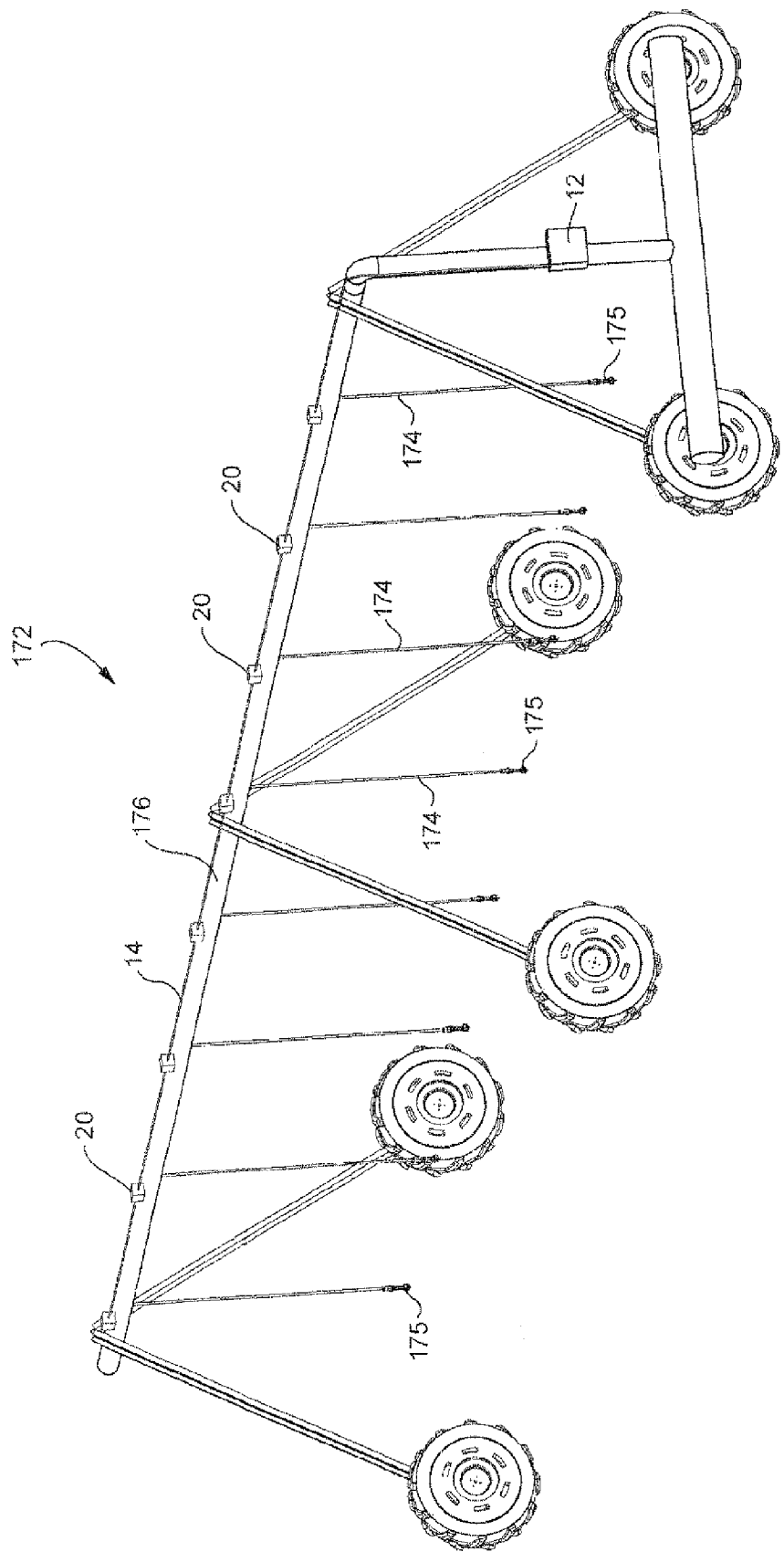
FIG. 14 is a schematic view of another application similar to FIG. 13, but where slave controllers are mounted along the top of the overhead truss.

FIG. 14 illustrates another example application similar to that shown in FIG. 13 but where the slave controllers or modules 20 are mounted along the overhead truss 176 of a linear irrigation machine.

Figure 15:
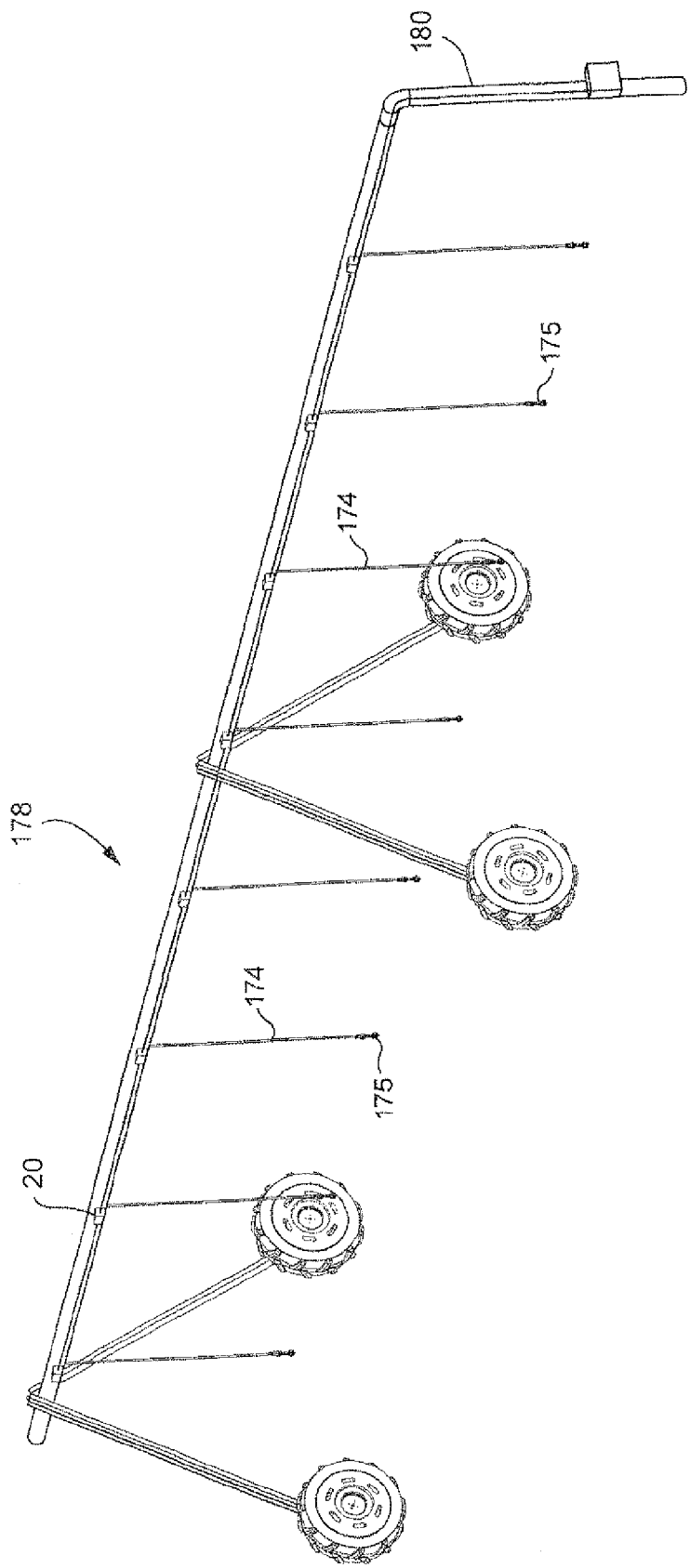
FIG. 15 is a perspective view of yet another application where the master controller is mounted at the center pivot of a pivot irrigation machine and the slave controllers are mounted along the top of an overhead truss of the machine.

FIG. 15 illustrates yet another example application, similar to that shown in FIG. 14 but wherein the irrigator is in the form of a pivot machine 178, with the vertical conduit section 180 representing the center pivot of the machine.

Figure 16A:
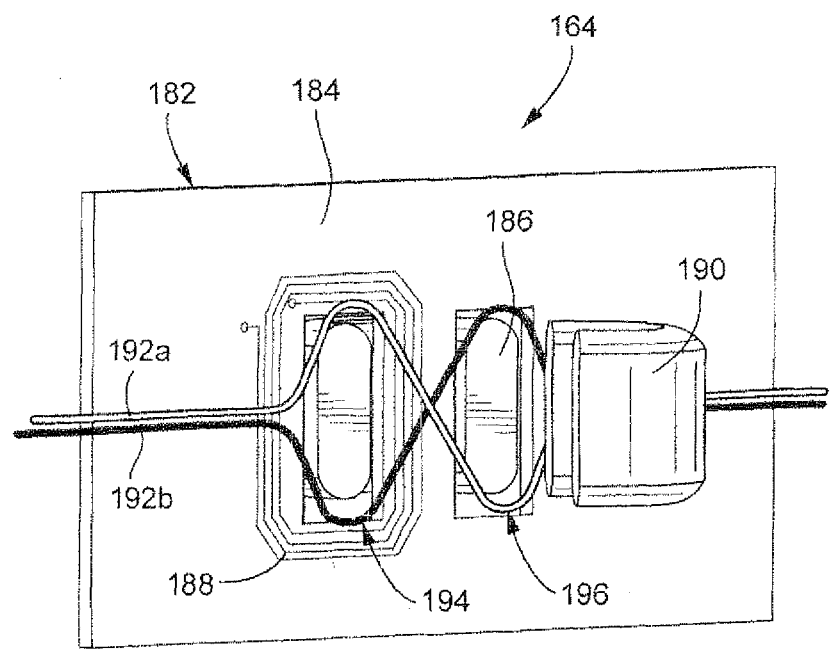
FIGS. 16A and 16B illustrate an alternative inductive coupler incorporating sine wave-shaped inductive coupling loops, the coupler shown in open and closed positions.
Figure 16B:
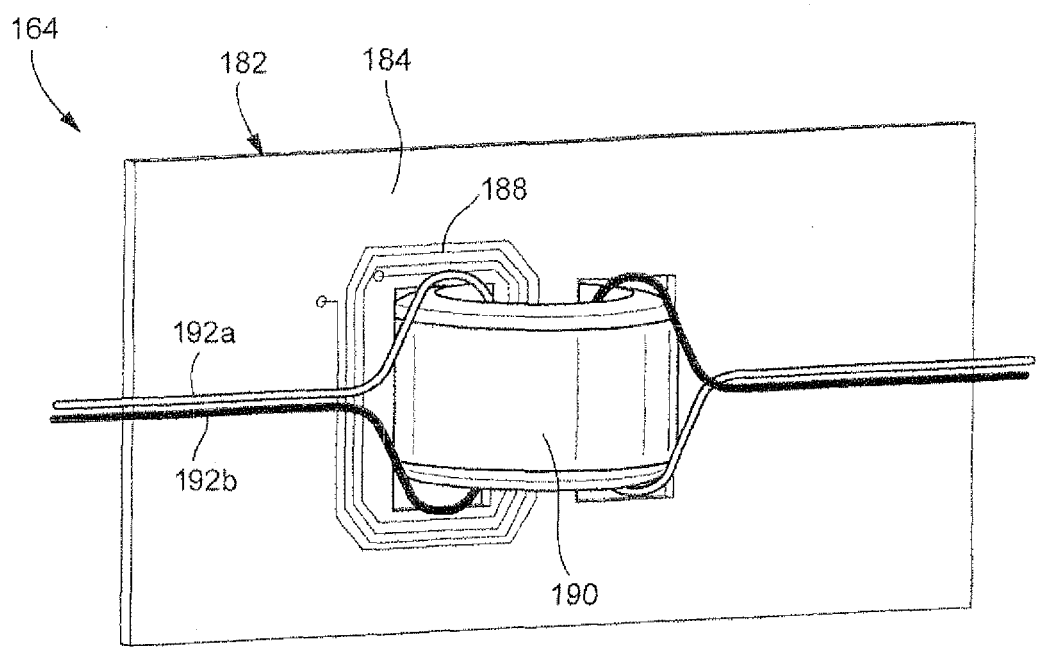

FIGS. 16A and 16B illustrate an alternative inductive coupler assembly similar to that shown in FIGS. 6-10 but simplified for convenience and clarity. In this alternative configuration, the housing 164 is only partially shown, with the lower body portion 182 supporting the slave controller circuit board 184, the split core inductor portion 186 and winding or coil 188. The split core coupler closure 190 is supported in the upper cover portion of the housing (not shown). It will be appreciated, however, that the upper cover portion, like the upper cover portion 168 (FIGS. 10-11), may be pivoted from an open position (FIG. 16A) to a closed position (FIG. 16B), so that, when closed, the split core inductor portion 186 and split core coupler closure 190 will close the inductor coupler about the transmission line conductors 192*a* and 192*b*. In this alternative arrangement, the conductors 192*a* and 192*b* are arranged to form mirror-image loops having a shape in the form of a sine wave, herein referred to as sine loops, with a pair of loop portions 194, 196 in each loop arranged so that the ferrite split core coupler closure 190 passes through the loops. It will be understood that the electrical path including the inductive coupling is identical to the first-described embodiment. Only the loops are altered, from substantially closed 360° loops to "unfolded" loops extending generally in a linear path, where the bend radii at each loop are substantially identical.

While the invention has been described in connection with what is presently considered to be the most practical and preferred embodiment, it is to be understood that the invention is not to be limited to the disclosed embodiment, but on the contrary, is intended to cover various modifications and equivalent arrangements.

What is claimed is:

1. A distributed control system comprising:
   a master controller connected to a transmission line and adapted to deliver power and data to the transmission line and to receive data from the transmission line;
   said transmission line comprised of first and second conductors configured to carry differential data and power, wherein the electromagnetic fields generated by the first and second conductor are out of phase with each other along the transmission line; and
   a plurality of inductive couplers arranged along the transmission line and remain stationary with respect to the transmission line while the line carries the power and data, each inductive coupler enclosing an inductive coupling loop formed by arranging one of the first and second conductors to follow a clockwise path and by arranging other one of the first and second conductors to follow a counter-clockwise path, each inductive coupling loop comprising the first and second conductors passing through a single core opening in a respective one of said inductive couplers to thereby establish mutual coupling between the transmission line and an inductive coupler coil, wherein the first conductor passes once through the single core opening, and the second conductor forms a loop of equal to or greater than three hundred and sixty degrees that passes through the single core opening, and said inductive coupler coil is connected to one or more slave controllers;

wherein said mutual coupling permits data transfer from the master controller to the one or more slave controllers and from the one or more slave controllers to the master controller, and wherein said mutual coupling transfers power from the transmission line to the one or more slave controllers.

2. The distributed control system of claim 1 wherein the one or more slave controllers utilize solenoids to control one or more sprinkler components.

3. The distributed control system of claim 1 wherein said inductive coupler, for each of the one or more slave controllers, comprises first and second split core portions joined to form a toroidal core defining said single core opening through which said inductive coupling loops pass, and wherein one of the first and second split core portion is wound with said inductive coupler coil.

4. The distributed control system of claim 3 wherein said first and second split core portions are composed of powdered ferrite material.

5. The distributed control system of claim 1 wherein said master controller includes at least one microcontroller connected to a user interface permitting an operator to configure and operate the distributed control system.

6. The distributed control system of claim 1 wherein a switch controlled by said master controller determines when data is transmitted to said one or more slave controllers, and when data is received from said one or more slave controllers.

7. The distributed control system of claim 3 wherein each of said one or more slave controllers includes a circuit board supporting said first and second split core portions and said inductive coupling loops.

8. The distributed control system of claim 7 and further comprising a housing enclosing said circuit board, said first and second split core portions and said inductive coupling loops.

9. The distributed control system of claim wherein said housing comprises a lower body portion and an upper cover portion, said upper cover portion is moveable between open and closed positions, and wherein said first split core portion and said inductive coupling loops are supported in said upper cover portion, and wherein said second split core portion and the coil are supported in said lower body portion.

10. The distributed control system of claim 8 wherein said one or more slave controllers comprise plural slave controllers secured, respectively, to base components of sprinklers arranged along a water supply conduit.

11. The distributed control system of claim 1 wherein said one or more slave controllers comprise plural slave controllers secured, respectively, on drop hoses connected to an overhead truss of a linear or pivot irrigation machine, each drop hose supporting a sprinkler controlled by one of said plural slave controllers.

12. The distributed control system of claim 1 wherein said one or more slave controllers comprise plural slave controllers mounted along an overhead truss of a linear or pivot irrigation machine, with plural drop hoses suspended from said overhead truss, said plural drop hoses each supporting a sprinkler controlled by a respective one of said plural slave controllers.

13. The distributed control system of claim 1 wherein said inductive coupling loops are circular, substantially 360 degree closed loops.

14. A coupler assembly for electrically coupling a coupling loop formed using a first and second conductor from a transmission line and a slave controller, wherein electromagnetic fields generated by the first and second conductor are out of phase with each other along the transmission line, the coupler assembly comprises:

a housing including a first body portion and a second body portion, a split core, a winding or coil around the split core is conductively coupled to a slave controller;

the coupling loop including the first conductor arranged along a clockwise path and the second conductor arranged along a counter-clockwise path and the first conductor passes once through an opening of the split core and the second conductor forms a loop of equal to or greater than three hundred and sixty degrees that passes through opening of the split core, and;

wherein said second body portion is moveable relative to the first body position between open and closed positions, and wherein a first half of the split core and the coupling loop is supported in said second body portion, wherein a second half of the split core and a coil are supported in said first body portion, wherein a mutual coupling between the coupling loop and the winding or coil transfers electrical power and data between the transmission line and the slave controller, and wherein the coupler assembly remains stationary with respect to the transmission line while the line carries the power and data.

15. The inductive coupler assembly of claim 14 wherein said first body portion incorporates a slave controller circuit board supporting said second half of the split core and coil.

16. The inductive coupler assembly of claim 14 wherein said inductive coupling loops are circular, substantially 360° closed loops.

17. A method of controlling a plurality of sprinklers in an irrigation system that includes a master controller for controlling a plurality of slave controllers each operatively connected to one or more of said plurality of sprinkler components, the method comprising:

(a) providing a transmission line having a first and second conductor, wherein electromagnetic fields generated by the first and second conductor are out of phase with each other along the transmission line;

(b) forming a plurality of coupling loops along the transmission line, wherein each coupling loop is formed by arranging the first and second conductors of the transmission line in a loop so that one of the first and second conductors follows a clockwise path and the other of the first and second conductors follows a counter-clockwise path;

(c) coupling each of said coupling loops to a respective one of said slave controllers by passing said coupling loop through a single core of an inductive coupler connected to the respective one of the slave controllers, wherein each single core includes a coupling loop passing once through the core and another coupling loop that extends equal to or greater than three hundred and sixty degrees; and (d) sending electrical power and data signals over said transmission line from said master controller to said plurality of slave controllers, wherein the power and data signals are inductively transferred through the inductive coupling of each of the coupling loops to the respective one of the slave controllers, wherein the coupling loops remain stationary with respect to the transmission line while the line carries the power and data.

18. A distributed control comprising:

a master controller connected to a transmission line and adapted to deliver power and data to the transmission line;

said transmission line comprised of first and second conductors configured to carry differential data, wherein electromagnetic fields generated by the first and second conductor are out of phase with each other along the transmission line;

a plurality of coupling loops distributed along the transmission line, wherein each coupling loop includes one of the first and second conductors arranged in a clockwise path and the other of the first and second conductors arranged in a counter-clockwise path; and a plurality of inductive couplers enclosing each of the respective coupling loops, each inductive coupler comprising a core having a single opening to thereby establish mutual coupling between the transmission line and to one or more slave controllers, wherein each of the cores has one of the respective coupling loops passing once through the single opening and another of the respective coupling loops extending equal to or greater than three hundred and sixty degrees around the core, and;

wherein said mutual coupling permits data transfer from the master controller to the one or more slave controllers and transfers electrical power from the transmission line to each of the slave controllers, and each of the coupling loops remain stationary with respect to the transmission line while the line carries the power and data.

19. The distributed control system of claim 18 wherein the one or more slave controllers utilize solenoids to control one or more sprinkler components.

20. The distributed control system of claim 18 wherein said inductive coupler comprises first and second split core portions joined to form a toroidal core defining said single core opening through which said coupling loops pass, and wherein one of the first and second split core portion is wound with said inductive coupler coil.

21. The distributed control system of claim 18 wherein said one or more slave controllers comprise plural slave controllers secured, respectively, to base components of sprinklers arranged along a water supply conduit.

22. The distributed control system of claim 18 wherein said one or more slave controllers comprise plural slave controllers secured, respectively, on drop hoses connected to an overhead truss of a linear or pivot irrigation machine, each drop hose supporting a sprinkler controlled by one of said plural slave controllers.

23. The distributed control system of claim 18 wherein said one or more slave controllers comprise plural slave controllers mounted along an overhead truss of a linear or pivot irrigation machine, with plural drop hoses suspended from said overhead truss, said plural drop hoses each supporting a sprinkler controlled by a respective one of said plural slave controllers.

* * * * *